Figure 4:
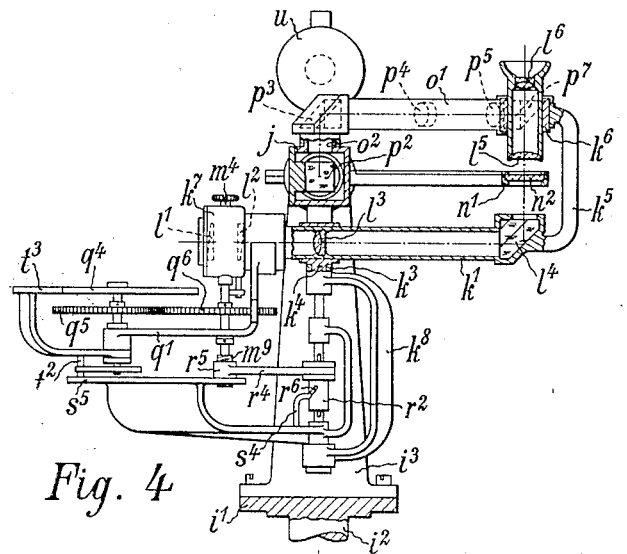

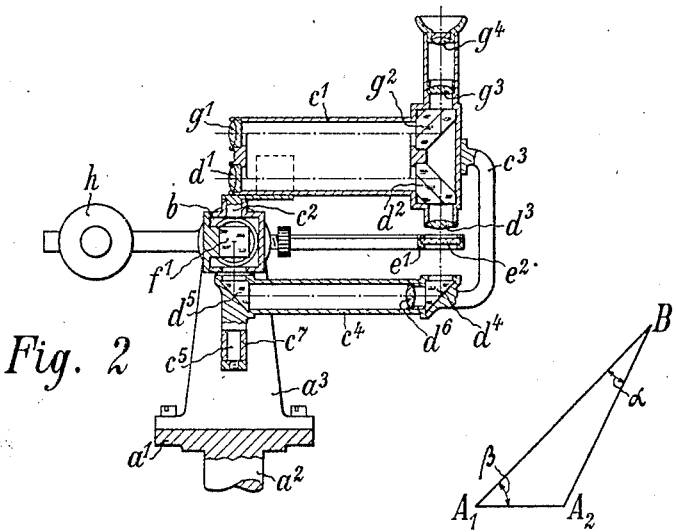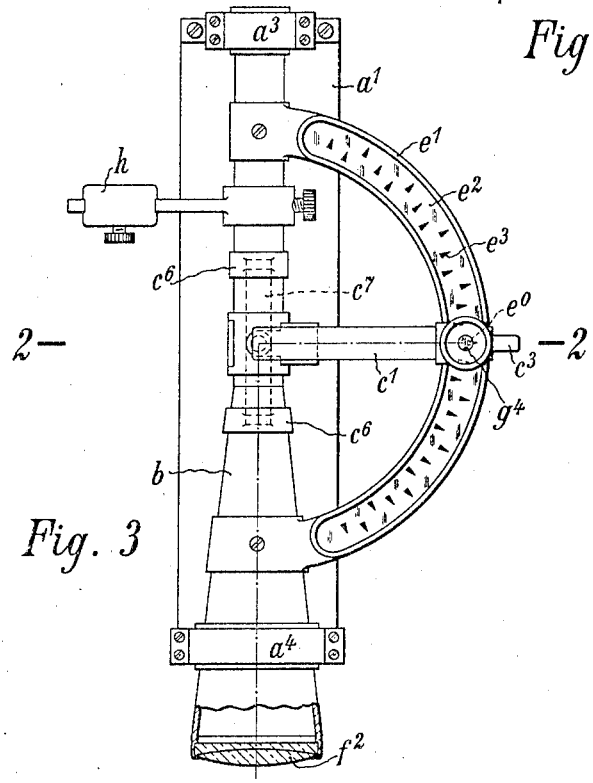

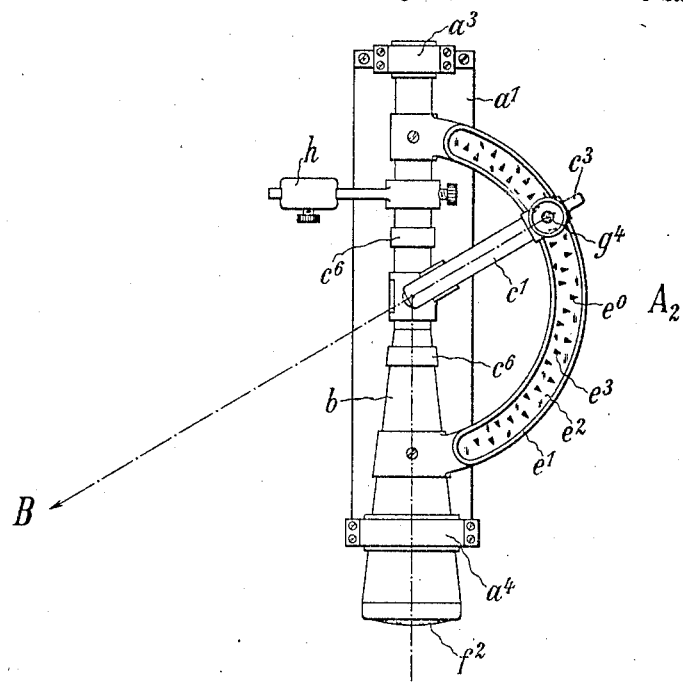
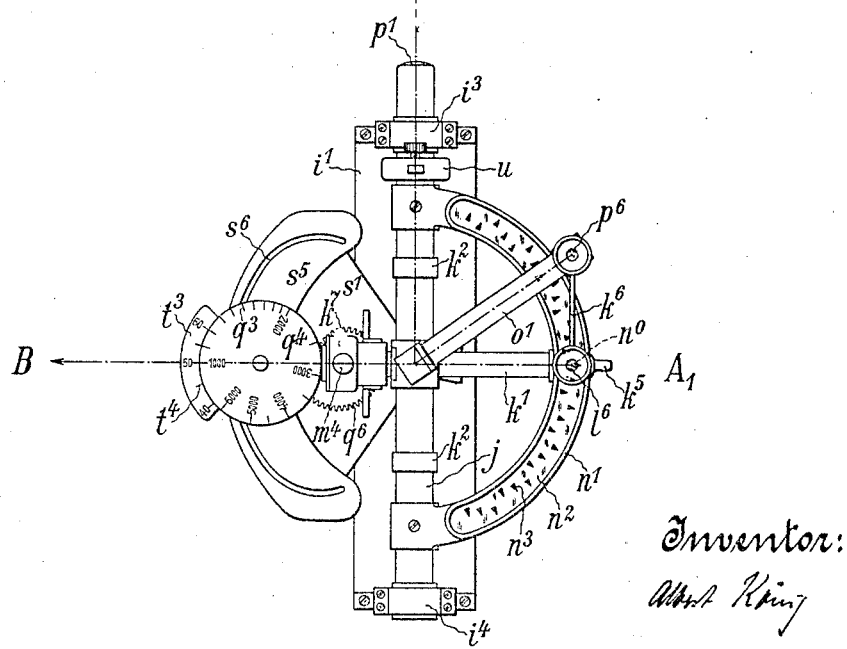
Fig. 8

Patented Nov. 27, 1923.

1,475,706

UNITED STATES PATENT OFFICE.

ALBERT KÖNIG, OF JENA, GERMANY, ASSIGNOR TO THE FIRM CARL ZEISS, OF JENA, GERMANY.

TELEMETER.

Application filed August 1, 1921. Serial No. 488,979.

*To all whom it may concern:*

Be it known that I, ALBERT KÖNIG, a citizen of the German Empire, residing at Jena, Germany, have invented a new and useful Telemeter (for which I have filed an application in Germany March 3, 1917, and in Austria April 15, 1918), of which the following is a specification.

The present invention relates to a telemeter, consisting of two telescopes set up with their objectives at different stations, i. e. in which the two objectives are not united by an instrument-body.

In the telemeters of this kind already known there is, at each of the two stations, not only an objective but a complete telescope. In these known telemeters the measuring process consists in each of the two telescopes being directed by an observer to the object to be measured and in transmitting the position, which the telescopes then occupy relatively to the connecting line of the two stations (the base-line), by means of an electric transmission to a device, belonging to both telescopes, in such a manner that by the said device the distance of the object to be measured (or a value from which this distance may be determined) is indicated.

In the new telemeter the two oculars of the telescopes have been united to a system suited for binocular use and, in addition, behind each of the objectives, i. e. at its station a number of marks have been disposed in such a manner, that the stereoscopic marks, produced by two corresponding marks each are lying at the same apparent distance and, finally, one of the two telescopes is provided with an adjusting device which allows of bringing the spatial image of the object to be measured, obtained with binocular observation, into the same apparent distance with the said stereoscopic marks.

The pair of oculars may be disposed at one of the two stations; the ocular belonging to the other station is then, by adding adequate optical means, to be completed in such a way as to allow of observing the filling up of the field of view of the other objective, viz the image of the object to be measured produced by the other objective, as well as the marks disposed behind this objective. If the ocular-system be not disposed at either of the two stations, both oculars should be completed in the manner described above.

This completion suitably consists in allowing the system, forming the ocular, to be composed of two separate parts, viz of a front part, lying at the station of the field of view to be observed, where it produces an enlarged image of the filling up of the field of view, and of a rear part, forming a telescope which lies at the station of the observer and serves for the observation of this image.

By adding to each of the two telescopes a sighting device (e. g. again a telescope) and by coupling this device to an optical intermediate system in such a way, that the image of the object to be measured will be presented to the appertaining ocular, when the sighting device is directed towards the object to be measured, it is possible to command by means of the telemeter a larger angular range than that of the oculars. If, in that case the pair of oculars proper be disposed at one of the two stations, the respective one of the two telescopes, forming the telemeter, may be used as a sighting device.

A particularly large, angular range is rendered available for telemetric work by disposing each of the two objectives in such a manner as to be rotatable about an axis, which, whilst being perpendicular to that of the objective, passes through its rear principal point and, furthermore, by so coupling the objective to a sighting device, disposed in the above mentioned way, as to participate in the motions of the said sighting device and, finally, by disposing the appertaining marks on a cylindric surface, the axis of which coincides with the axis of rotation of the objective. It is obvious that instead of disposing the marks themselves on the said cylindric surface, they may be disposed on any desired surface, provided the marks are imaged with the aid of an optical system in such a manner that the image is lying on such a cylindric surface. The marks may, e. g. be disposed in a plane, which is parallel to the axis of the objective, and, in addition, between the objective and the marks a reflector may be disposed which is conjointly rotatable with the objective and deflects by 90° a ray passing within the axis of the objective; by means of such a reflector a reflection of the mark, to which the deflected axis of the objective happens to be directed, is produced and all reflections of the marks are lying on a cylindric surface which is in the aforesaid position.

Figure 5:
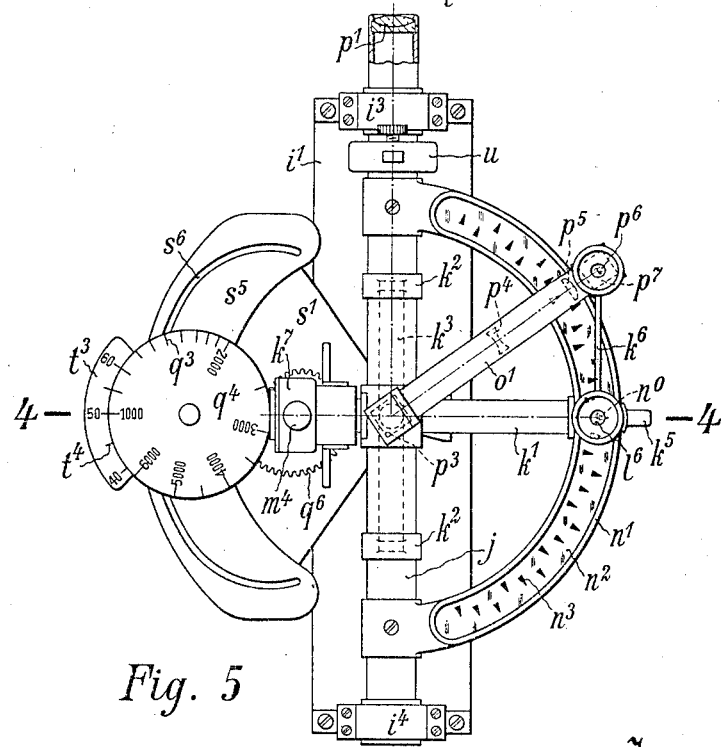
Figure 6:
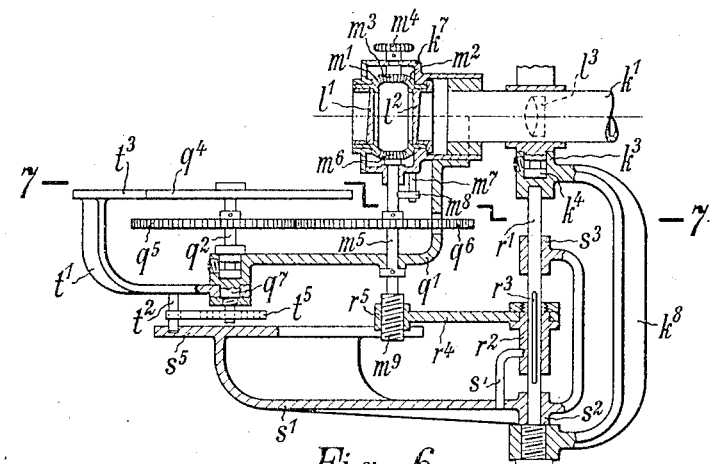
Figure 7:
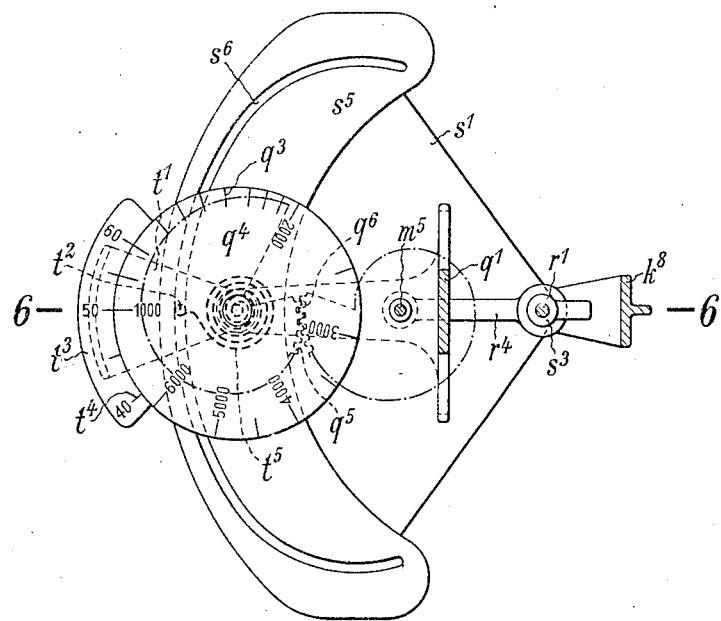

In the annexed drawing Fig. 1 shows the measuring triangle; Figs. 2 to 8 represent a constructional example of the invention, viz Figs. 2 and 3 show the part of the telemeter to be disposed at the right station (Fig. 2 in a side elevation on line 2—2 of Fig. 3, Fig. 3 in a plan elevation), Figs. 4 and 5 the part of the telemeter to be disposed at the left station (Fig. 4 in a side elevation on line 4—4 of Fig. 4, Fig. 5 in a plan elevation), whilst Figs. 6 and 7, corresponding to Figs. 4 and 5, show part of Figs. 4 and 5 on a larger scale, Fig. 6 is a section on line 6—6 of Fig. 7, Fig. 7 a section on line 7—7 of Fig. 6 and Fig. 8 a plan elevation of the entire apparatus.

First of all, with the aid of Fig. 1 a further improvement of the new telemeter may be explained. In this figure $A_1$ and $A_2$ denote the two stations and B the object to be measured; besides, in order to obtain a greater clearness of the drawing, the distance between the object to be measured and the two stations, in proportion to the distance apart of the two stations, has been assumed as much smaller than it will, in general, really be. $\alpha$ denotes the angle which the straight lines $A_1B$ and $A_2B$ (the two connecting lines of the object to be measured and of the two stations) embrace together, whilst $\beta$ denotes the angle, which the line $A_1B$, the connecting line of the left station ($A_1$) and of the object to be measured (B), i. e. the present sight line from the left station towards the object to be measured, embraces with the base-line ($A_1A_2$).

As it may be easily seen, the equation $$\overline{A_1B} = \overline{A_1A_2} \cdot \frac{\sin(\alpha+\beta)}{\sin \alpha}$$

holds good between the distance $A_1B$ of the object to be measured from the left station, the length supposed to be known of the base-line $A_1A_2$ and the angles $\alpha$ and $\beta$.

Upon the size of the angle $\alpha$ depends, as it is known by the stereoscopic telemeters having the base-line within the instrument, the amount by which the adjusting device must be adjusted from a certain zero-position in order to bring the spatial image of the object to be measured into the same apparent distance with the stereoscopic marks. Inversely, the said angle, provided there is a suitable graduation, may be read off, if the adjusting device has been adjusted to such an extent that the above mentioned equality of the apparent distances has been attained. If, in addition, the angle $\beta$ has been determined, the distance $A_1B$ to be found can easily be computed. In case it is desired to read the said distance directly, the telemeter should be fitted with a mechanism by means of which the above mentioned equation can be valued automatically. Hence, with an unchangeable length $A_1A_2$ of the base-line, the distance $A_1B$ will be indicated by the relative position of the two members (viz a graduation and an index) of a device showing the distance, if the graduation be a logarithmic one and provision be made that, when carrying out a measurement, both the graduation and the index make a movement relatively to each other which is proportional to the difference between log sin $(\alpha+\beta)$ and log sin $\alpha$. This may, f. i. be attained by providing the telescope, fitted with the adjusting device, with a sighting device (the services of which can also be performed by the said telescope itself) and by coupling on the one hand the one of the two members of the device indicating the distance, to the adjusting device in such a way that it moves relatively to its bearing with a displacement of the adjusting device in proportion to log sin $\alpha$, and on the other hand by coupling the other of the aforesaid two members to the adjusting device and to the sighting device in such a manner that it moves along the other member relatively to its bearing with an adjustment of the focusing device and of the sighting device in proportion to log sin $(\alpha+\beta)$. If it be desired to take into account different lengths of the base-line with such a mechanism, it is sufficient to dispose a number of indices, each of which being intended for a certain length of the base-line; in accordance with the above mentioned equation these indices then also form, on their part, a logarithmic graduation, progressing according to the lengths of the base-line. For the reading the line of this division corresponding to the respective length of the base-line is to be used in each case as an index for the graduation of the distance, unless one prefers disposing also a special index, which should be set along the graduation of the base-line at the respective amount of the base-line.

The (right) part of the constructional example, shown in Figs. 2 and 3, contains a base-plate $a^1$ which, in order to be placed on a stand, is fitted with a pivot $a^2$ and which carries two supports $a^3$ and $a^4$, the joint axis of which intersects rectangularly that of the said pivot $a^2$. A body $b$ is rotatably disposed in the said supports. A casing $c^1$ is rotatable relatively to this body about a pivot $c^2$, the axis of which intersects rectangularly the joint axis of the supports $a^3$ and $a^4$. With the aid of a bow $c^3$ a tube $c^4$ is rigidly connected with this casing, which tube is supported in a bridge $c^7$, fixed to the body $b$ by means of two collars $c^6$ by a pivot $c^5$, co-axial with the journal $c^2$. The casing $c^1$ contains inside an objective $d^1$, the axis of which is vertically intersected by that of the pivot $c^2$, viz in the rear principal point of the objective. Behind the objective $d^1$ a ridge-prism $d^2$ and close in front of the focal plane of the objective a collective lens $d^3$ are disposed. In the focal plane of the objective and fixed to the body $b$ by a mount $e^1$, there lies a circular segment-shaped glass-plate $e^2$, the centre of which is in the axis of the pivot $c^2$ and which is provided with marks $e^3$. The relative angular distances of these marks are alike, however, with regard to their distance from the aforesaid axis of the pivot the marks are disposed in such a manner that three each form a group, within which the distance from the axis of the pivot is increasing. The tube $c^1$ contains inside two prisms $d^4$ and $d^5$ as well as a collective lens $d^6$. By means of a reflecting prism $f^1$, disposed within the body $b$, the rays emerging from the prism $d^5$ are transmitted to a collective lens $f^2$, disposed at the left end of the body $b$, the axis of which lens coincides with the joint axis of the supports $a^3$ and $a^4$. Besides, within the casing $c^1$ a telescope, containing as optical parts an objective $g^1$, a rotatable prism $g^2$ and an ocular $g^3$, $g^4$ are disposed in such a manner that the axis of the objective $g^1$ is parallel to that of the objective $d^1$. By means of a counterpoise $h$ the centre of gravity of the body $b$ as well as the parts fitted to it fall into the joint axis of the supports $a^3$ and $a^4$.

The (left) part of the telemeter, shown in Figs. 4 to 7, contains a base-plate $i^1$ which in order to be placed on a stand, is provided with a pivot $i^2$, and which carries two supports $i^3$ and $i^4$, the joint axis of which intersects rectangularly that of the said pivot $i^2$. A body $j$ is rotatably disposed in the said supports. A tube $k^1$ is supported in a bridge $k^3$ with a journal $k^4$, the axis of which intersects rectangularly the joint axis of the supports $i^3$ and $i^4$. By means of a bow $k^5$ an eye-part $k^6$ is rigidly connected with the said tube. The tube $k^1$ contains inside a head-piece $k^7$ two refractive wedges $l^1$ and $l^2$, the mount of which is connected with one each of two conical wheels $m^1$ and $m^2$. In the latter there engages a conical wheel $m^3$, fitted with a driving-knob $m^4$. Behind the wedges $l^1$ and $l^2$ there are disposed an objective $l^3$ and a ridge-prism $l^4$; the axis of the objective $l^3$ is intersected rectangularly, viz in the rear principal point of the objective by the axis of the journal $k^4$. In the focal plane of the objective $l^3$ lies a circular segment-shaped glass plate $n^2$ which is fixed to the body $j$ by means of a mount $n^1$; the centre of the said glass plate, which is provided with marks $n^3$, lies in the axis of the said journal $k^4$. These marks are disposed in the same way as the marks $e^3$ of the right part of the telemeter.

An ocular $l^5$, $l^6$ is carried by the eye-part $k^6$, the latter being fitted to a tube $o^1$, which may be rotated about a hollow journal $o^2$, co-axial with the journal $k^4$. At the right end of the body $j$ a collective lens $p^1$ is disposed, which collects the rays emerging from the lens $f^2$ of the right part of the telemeter and transmits them to a reflecting prism $p^2$, disposed inside the body $j$.

The tube $o^1$ contains a reflecting prism $p^3$, which receives the rays emerging from the prism $p^2$, a dispersive lens $p^4$, forming with the lens $p^1$ a collective system of comparatively long focus, and an ocular $p^5$, $p^6$, between the two members of which a reflecting prism $p^7$ is disposed. The distance apart of the axes of inspection of the two oculars $l^5$, $l^6$ and $p^5$, $p^6$ is equal to the average interocular distance of a human being. Inside a body $q^1$, fitted to the head piece $k^7$, a shaft $q^2$ is rotatably disposed, on which a disc $q^4$ provided with a logarithmic distance scale $q^3$ is fastened. On the said shaft $q^2$ there is also fixed a toothed wheel $q^5$, the teeth of which are lying on a spiral-like line. In this toothed wheel engages another one $q^6$, the teeth of which are also lying on a spiral-like line and which is fastened on a shaft $m^5$. The latter is supported inside the head piece $k^7$ and carries at its top end a conical wheel $m^6$, engaging in the conical wheels $m^1$ and $m^2$. By means of a stop $m^7$, which coacts with a pin $m^8$, fitted to the shaft $m^5$, the latter is prevented from making more than one revolution. The said shaft $m^5$ carries at its bottom end a thread $m^9$. In a bow $k^8$, disposed at the bottom of the bridge $k^3$, a bolt $r^1$, co-axial with the journal $k^4$, is fastened. A bush $r^2$ may be displaced on the said bolt, but by means of a feather $r^3$ it is prevented from rotating relatively to the bolt. An arm $r^4$ can be rotated on the bush $r^2$. It carries at its end a nut $r^5$ which encloses the thread $m^9$ of the shaft $m^5$. An arm $s^1$ is rotatably supported by two eyes $s^2$ and $s^3$ on the bolt $r^1$ and engages by means of a pin $s^4$ in a slit $r^6$, wound like a screw-line, of the bush $r^2$. At its end the arm $s^1$ carries a plate $s^5$ which is provided with a slit $s^6$. In the latter engages by means of a pin $t^2$ an arm $t^1$, which is rotatably supported on a pivot $q^7$, fitted co-axially with the shaft $q^2$ to the pedestal body $q^1$. At its end the said arm $t^1$ carries a circular segment $t^3$, provided with a logarithmic graduation of the base-line $t^4$ and moving along the distance scale $q^3$ by a rotation of the arm $t^1$. A spiral spring $t^5$ always tends to displace the arm $t^1$ in the sense, in which the numbering of the distance scale is decreasing, i. e., if viewed from above, counterclockwise. By means of a counterpoise $u$ the centre of gravity of the body $j$ together with the parts attached to it, are placed into the joint axis of the bearing $i^3$ and $i^4$. As to the use and the mode of acting of the telemeter represented in the annexed drawing the following remarks may be made. Both parts of the telemeter are placed on a stand, i. e each of them at one of the two stations and brought into such a position relatively to each other that the joint axis of the bearings $a^3$ and $a^4$ falls about into a straight line with the joint axis of the bearings $i^3$ and $i^4$; that the said relative position exists, may be ascertained, f. i., with the aid of auxiliary telescopes. Hereupon, an observer, standing at the left station and using with the left eye the ocular $l^5$ $l^6$ and with the right one the ocular $p^5$, $p^6$ places the left part of the telemeter, by rotating it about the pivot $i^2$ and by inclining it about the joint axis of the bearings $i^3$ and $i^4$, into such a position that the image of the object to be measured, produced by the objective $l^3$, lies in the field of view of the ocular $l^5$, $l^6$. At the same time an observer, standing at the right station and using the ocular $g^3$, $g^4$ places the right part of the telemeter, by rotating it about the pivot $a^2$ and by inclining it about the joint axis of the bearings $a^3$ and $a^4$ into such a position that the image of the object to be measured, produced by the objective $g^4$, lies in the field of view of the ocular $g^3$, $g^4$. Owing to the said position given to the right part of the telemeter, an image of the object to be measured is also produced at the place of the mark plate $e^2$ by the objective $d^1$ with the aid of the lens $d^3$. This image is imaged by the lens $d^6$ at the place of the lens $f^2$ and the image produced there is imaged by the system $p^1$, $p^4$ in the field of view of the ocular $p^5$, $p^6$. Along with the image of the object to be measured, lying in the field of view of the ocular $l^5$, $l^6$, at least two, but at the most three of the marks $n^3$ are always visible at that place. In the same manner along with the image of the object to be measured, lying in the field of view of the ocular $p^5$, $p^6$, at least two, but at the most three of the marks $e^3$ are always visible at that place. Owing to the constant smallness of the angle (the angle $\alpha$ in Fig. 1) embraced by the two connecting lines of the object to be measured and the two stations (the lines $A_1B$ and $A_2B$ in Fig. 1), at least one of the marks, visible in the field of view of the ocular $l^5$, $l^6$ corresponds with one of the marks, visible in the field of view of the ocular $p^5$, $p^6$. Marks corresponding to each other are in that case those which, with regard to the central marks (denoted in the drawing by $e^0$ and and $n^0$) have the same position; hence, f. i. to that of the marks $e^3$, being the third to the left from the mark $e^0$, corresponds to that of the marks $n^3$, being the third to the left from the marks $n^0$. Two corresponding marks each produce with binocular observation a steroscopic mark, but, owing to the marks being disposed at intervals of three each and in such a manner that in each field of view at the most three are visible at the same time, provision is made that always only marks corresponding to each other will be able to produce a stereoscopic mark. The images of the object to be measured, visible in the fields of view of the oculars $l^5$, $l^6$ and $p^5$ $p^6$ produce with binocular observation a spatial image of the object to be measured. If the observer at the left station actuates the knob $m^4$, the wedges $l^1$ and $l^2$ are displaced relatively to each other and the apparent distance of the spatial image of the object to be measured is changed, whilst the apparent distance of the stereoscopic marks is independent of the relative position of the wedges. The measurement is effected in such a way that the observer at the left station actuates the knob $m^4$ in such a sense and to such an extent that the spatial image of the object to be measured comes to lie in that apparent distance, at which the stereoscopic marks are lying. As soon as this equality of the apparent distances has been reached, that line of the graduation $t^4$, which corresponds with the length of the base-line (the line $A_1A_2$ in Fig. 1), indicates on the graduation $q^3$ the distance of the object to be measured from the left station (the length of the line $A_1B$ in Fig. 1). The lines on which the teeth of the toothed wheel $q^5$ and $q^6$ are lying, are of such a shape, that by actuating the knob $m^4$, the disc $q^4$ rotates relatively to the pedestal body $q^1$ by an angle, which is proportional to the logarithm of the sine of that angle by which, owing to the relative rotation of the wedges $l^1$ and $l^2$, the passing axial ray is deflected; if, therefore, by actuating the knob $m^4$ the aforesaid conformity of the apparent distances has been attained, the disc $q^4$ has rotated relatively to the body $q^1$ by an angle, equal to log sin $\bar{\alpha}$. Furthermore, by actuating the knob $m^4$ a rotation of the shaft $m^5$ is effected, which by means of the thread gearing $m^6$, $r^5$ results in a displacement of the arm $r^4$ along the bolt rod $r^1$, in which displacement the bush $r^2$ takes part. The slit $r^6$ is shaped in such a manner that the said displacement of the bush $r^2$, causes with the aid of the pivot $s^4$ a displacement of the arm $s^1$ relatively to the bow $k^8$, which is equal to the angle $\alpha$. As the plane containing the axis of the bolt $r^1$ as well as that of the shaft $q^2$, in conjunction with the plane perpendicularly intersecting the optical axis of the objective $l^3$ and containing the base-line, embraces the angle $\beta$ (vide Fig. 1), provided the object to be measured is visible in the centre of the field of view of the ocular $l^5$, $l^6$, the first of the two above mentioned planes, along with the symmetric plane of the slit $s^6$, containing the axis of the bolt $r^1$, always embraces the angle $\alpha+\beta$. Finally, the slit $s^6$ is of such a shape that the displacement, which the circular segment $t^3$ undergoes through a change in the above angle of the size $\ddot{a}+\beta$ relatively to the pedestal body $q^1$, is proportional to log sin $(\ddot{a}+\beta)$. Hence, the disc $q^4$ and the circular segment $t^3$, by a rotation of the tube $k^1$ about the pivot $k^4$ and by actuating the knob $m^4$, are subject to a displacement along each other which is equal to log sin $(\ddot{a}+\beta)-$log sin $\ddot{a}$. Both the graduation $q^3$ (corresponding to the distance $A_1B$ of the object to be measured from the left station) and the graduation $t^4$ (corresponding to the base-line $A_1A_2$) being logarithmic and the scale of the said graduations being chosen accordingly, each line of the graduation $t^4$ (which in accordance with the range of action of the telemeter comes into question at all) therefore indicates on the graduation $q^3$ that value for $A_1B$ which is due to an object to be measured for which, taking as a basis the length of the base-line $A_1A_2$ appertaining to the respective line of the graduation, the measurement is effected, according to the above mentioned equation—

$$\overline{A_1B} = \overline{A_1A_2} \cdot \frac{\sin(\alpha+\beta)}{\sin \alpha}.$$

Hence, in the position illustrated of the telemeter, on basing on a base-line of 50 m., a distance of 1000 m. is indicated, whilst with a length of the base-line of 55 m. a distance of 1100 m. and with a length of the base-line of 60 m. a distance of 1200 m. is indicated.

I claim:

1. In a telemeter consisting of two observing instruments each of which comprises an objective and an ocular, the objectives being set up at two different stations and the axes of the oculars lying parallel at a distance apart equal to the interocular distance, a mark carrier disposed behind each of the said objectives at the station of the telemeter and carrying a number of marks which are visible in the appertaining ocular and arranged in such a manner that the stereoscopic marks produced by two corresponding marks each, are lying at the same apparent distance, and an adjusting device fitted to one of the said observing instruments and adapted to bring the spatial image of the object to be measured and the stereoscopic marks into the same apparent distance.

2. In a telemeter consisting of two observing instruments, each of which comprises an objective and an ocular, the objectives being set up at two different stations and the axes of the oculars lying parallel at a distance apart equal to the interocular distance, a mark carrier, disposed behind each of the said objectives at the station of the telemeter and carrying a number of marks which are visible in the appertaining ocular and arranged in such a manner that the stereoscopic marks produced by two corresponding marks each, are lying at the same apparent distance, and an adjusting device fitted to one of the said observing instruments and adapted to bring the spatial image of the object to be measured and the stereoscopic marks into the same apparent distance, the observing system destined for the observation of the filling up of that field of view of the objective which does not lie at the station of the observer consisting of a front part, lying at the station of the field of view to be observed and producing at the said station an enlarged image of the filling up of the image-field, and of a rear part, forming a telescope and lying at the station of the observer.

3. In a telemeter consisting of two observing instruments, each of which comprises an objective and an ocular, the objectives being set up at two different stations and being each rotatable about an axis perpendicular to that of the objective and passing through its rear principal point, at each station a sighting device coupled to the appertaining objective so as to participate in the motions of this objective, the axes of the oculars lying parallel in a distance apart equal to the interocular distance, a plane mark carrier disposed behind each of the said objectives at the station of the telemeter perpendicularly to the axis of rotation of the objective, a reflector interposed between the objective and the mark carrier and adapted to deflect the rays impinging on it about 90°, which mark carrier contains a number of marks which are visible in the appertaining ocular and arranged in such a manner that the stereoscopic marks produced by two corresponding marks each, are lying at the same apparent distance, and an adjusting device fitted to one of the said observing instruments and adapted to bring the spatial image of the object to be measured and the stereoscopic marks into the same apparent distance.

4. In a telemeter consisting of two observing instruments, each of which comprises an objective and an ocular, the objectives being set up at two different stations and the axes of the oculars lying parallel at a distance apart equal to the interocular distance, a mark carrier disposed behind each of the said objectives at the station of the telemeter and carrying a number of marks which are visible in the appertaining ocular and arranged in such a manner that the stereoscopic marks produced by two corresponding marks each, are lying at the same apparent distance, a sighting device fitted to the telescope provided with the said adjusting device, a range-indicating device consisting of a logarithmic range scale and an index coacting with this scale, the one of these two members being so coupled to the adjusting device that with a displacement of the said adjusting device relatively to its bearing the said coupled member moves in proportion to the logarithm of the sine of that angle which, being embraced by the two connecting lines of the object to be measured and of the two stations, belongs to the position in each particular case of the adjusting device, the other member of the said range-indicating device being so coupled to the adjusting device and the said sighting device that with a displacement of the adjusting device and of the sighting device the said member moves along the other member relatively to its bearing in proportion to the logarithm of the sine of the total of the said angle and of the angle, embraced in each particular case by the sight line of the sighting device with the line connecting the two stations.

5. In a telemeter consisting of two observing instruments, each of which comprises an objective and an ocular, the objectives being set up at two different stations and the axes of the oculars lying parallel at a distance apart equal to the interocular distance, a mark carrier disposed behind each of the said objectives at the station of the telemeter and carrying a number of marks, which are visible in the appertaining ocular and arranged in such a manner that the stereoscopic marks produced by two corresponding marks each, are lying at the same apparent distance, a sighting device fitted to the telescope provided with the said adjusting device, a range-indicating device consisting of a logarithmic range scale and another scale representing the distance apart of the two stations, these two scales being movable along each other and the one of these two scales being so coupled to the adjusting device that with a displacement of the said adjusting device relatively to its bearing the said coupled member moves in proportion to the logarithm of the sine of that angle which, being embraced by the two connecting lines of the object to be measured and of the two stations, belongs to the position in each particular case of the adjusting device, while the other scale is so coupled to the adjusting device and the said sighting device that with a displacement of the adjusting device and of the sighting device this scale moves along the other one relatively to its bearing in proportion to the logarithm of the sine of the total of the said angle and of the angle, embraced in each particular case by the sight line of the sighting device with the line connecting the two stations.

ALBERT KÖNIG.

Witnesses:
 PAUL KRÜGER,
 FRITZ LANDER.